United States Patent
Kuo et al.

(10) Patent No.: US 11,181,778 B2
(45) Date of Patent: Nov. 23, 2021

(54) DISPLAY DEVICE COMPRISING A DICHROIC REFLECTION LAYER HAVING A PLURALITY OF RECESSED PORTIONS DISPOSED WITH A CORRESPONDING PLURALITY OF QUANTUM DOT BLOCKS

(71) Applicant: AU OPTRONICS CORPORATION, Hsin-Chu (TW)

(72) Inventors: Ting-Yi Kuo, Hsin-Chu (TW); Han-Min Tsai, Hsin-Chu (TW); Pi-Fei Tsai, Hsin-Chu (TW); Hung-Chih Luan, Hsin-Chu (TW); Sheng-Hung Wang, Hsin-Chu (TW); He-Yuan Yang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 33 days.

(21) Appl. No.: 16/253,373

(22) Filed: Jan. 22, 2019

(65) Prior Publication Data
US 2019/0250464 A1      Aug. 15, 2019

(30) Foreign Application Priority Data
Feb. 12, 2018    (TW) ................. 107105065

(51) Int. Cl.
  *G02F 1/13357*    (2006.01)
  *G02F 1/1335*     (2006.01)
  *G02F 1/1345*     (2006.01)

(52) U.S. Cl.
  CPC ...... *G02F 1/133617* (2013.01); *G02F 1/1345* (2013.01); *G02F 1/133528* (2013.01);
  (Continued)

(58) Field of Classification Search
  CPC ......... G02F 1/133617; G02F 1/133621; G02F 2201/34; G02F 2201/307; G02F 2203/05; G02F 2202/043; G02F 1/133602
  See application file for complete search history.

(56) References Cited

U.S. PATENT DOCUMENTS 7,746,423 B2   6/2010   Im et al.
8,582,057 B2   11/2013  Jung et al.
(Continued)

FOREIGN PATENT DOCUMENTS

CN    104914622 A      9/2015
CN    104932142 A  *   9/2015   ....... G02F 1/133605
(Continued)

OTHER PUBLICATIONS

CNIPA has issued the Office Action for the corresponding China application dated Aug. 19, 2020.
(Continued)

*Primary Examiner* — Paul C Lee
(74) *Attorney, Agent, or Firm* — WPAT, PC

(57) ABSTRACT

The present invention provides a display device, including: a first chromatic light source configured to generate first chromatic light, a dichroic reflection layer disposed on a light emergent side of the first chromatic light source and allowing the first chromatic light to pass through, and a quantum dot layer. The dichroic reflection layer has a first surface facing away from the first chromatic light source, and the first surface has a plurality of recessed portions. The quantum dot layer includes a plurality of quantum dot blocks, and the quantum dot blocks are disposed corresponding to the recessed portions.

16 Claims, 10 Drawing Sheets

(52) U.S. Cl.
CPC .. *G02F 1/133621* (2013.01); *G02F 1/133614* (2021.01); *G02F 2201/123* (2013.01); *G02F 2201/34* (2013.01); *G02F 2202/36* (2013.01)

(56) References Cited

U.S. PATENT DOCUMENTS

| | | | |
|---|---|---|---|
| 9,869,897 B2 | 1/2018 | Liu | |
| 2014/0233212 A1* | 8/2014 | Park | G02F 1/133617 362/84 |
| 2016/0067948 A1* | 3/2016 | Chang | C03B 23/02 428/161 |
| 2016/0363814 A1* | 12/2016 | Liu | G02F 1/133617 |

FOREIGN PATENT DOCUMENTS

| | | | | |
|---|---|---|---|---|
| CN | 104932142 A | | 9/2015 | |
| CN | 106299075 A | | 1/2017 | |
| CN | 108535911 A | * | 9/2018 | ........... G02B 5/3016 |
| CN | 108761903 A | * | 11/2018 | ....... G02F 1/133621 |
| JP | 2003287746 A | | 10/2003 | |
| TW | I462344 B | | 11/2014 | |
| TW | I609504 B | | 12/2017 | |

OTHER PUBLICATIONS

CNIPA has issued the Office Action for the corresponding China application dated Mar. 2, 2021.

\* cited by examiner

DISPLAY DEVICE COMPRISING A DICHROIC REFLECTION LAYER HAVING A PLURALITY OF RECESSED PORTIONS DISPOSED WITH A CORRESPONDING PLURALITY OF QUANTUM DOT BLOCKS

BACKGROUND

Technical Field

The present invention relates to a display device. Specifically, the present invention relates to a display device having a dichroic reflection layer.

Related Art

Liquid crystal display devices are very important in the current display field. However, according to an existing technology, the liquid crystal display device still has some limitations in the chromatic purity and the color gamut span. Therefore, compared with a conventional liquid crystal display device, quantum dot light-emitting technologies that can improve the chromatic purity and the color gamut span gradually develop and attract more and more attention.

In a display device using quantum dots for light emission, a light leakage is likely to be caused due to a characteristic of 360-degree divergence of the quantum dots, resulting in display quality degradation. In addition, light emission strength of the quantum dots is likely to be dispersed to different angles. Consequently, it is difficult to effectively improve light emission efficiency at a particular angle (for example, a front angle of view). In view of this, a technology by using which the light leakage can be reduced and the light intensity at a particular angle can be improved in the quantum dot display technology needs to be developed.

SUMMARY

To resolve the foregoing problem, an embodiment of the present invention provides a display device including a first chromatic light source, a dichroic reflection layer, and a quantum dot layer. The first chromatic light source is configured to generate first chromatic light. The dichroic reflection layer is disposed on a light emergent side of the first chromatic light source, and is configured to allow the first chromatic light to pass through. The dichroic reflection layer has a first surface facing away from the first chromatic light source, and the first surface has a plurality of recessed portions. The quantum dot layer includes a plurality of quantum dot blocks, and the plurality of quantum dot blocks are disposed corresponding to the recessed portions.

According to the display device provided in this embodiment of the present invention, chromatic light emitted by the quantum dot blocks corresponding to the recessed portions may be reflected by the dichroic reflection layer at the recessed portion, and therefore, is greatly centralized and emitted toward a particular angle. Therefore, light emission intensity at a particular angle can be improved, a possible light leakage is reduced, and further, display quality and light emission efficiency can be improved.

DETAILED DESCRIPTION

The following describes various embodiments, and a person of ordinary skill in the art can readily understand the spirit and the principle of the present invention with reference to the accompanying drawings of this specification. However, although some particular embodiments are described in this specification, these embodiments are merely used as examples, and are not limitative or exclusive in all aspects. Therefore, for a person of ordinary skill in the art, various modifications and changes made to the present invention should be apparent and readily implement without departing from the spirit and the principle of the present invention.

Figure 1A:
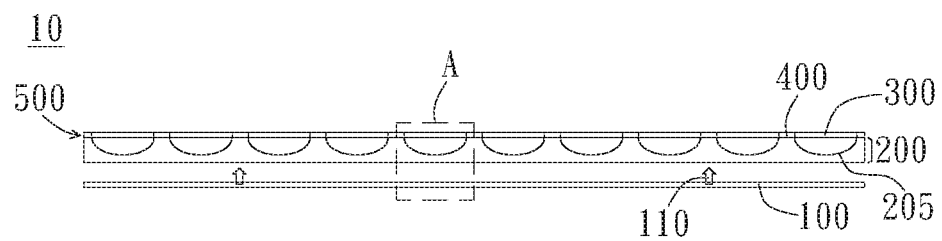
FIG. 1A is a schematic diagram of a display device according to the first embodiment of the present invention.
Figure 1B:
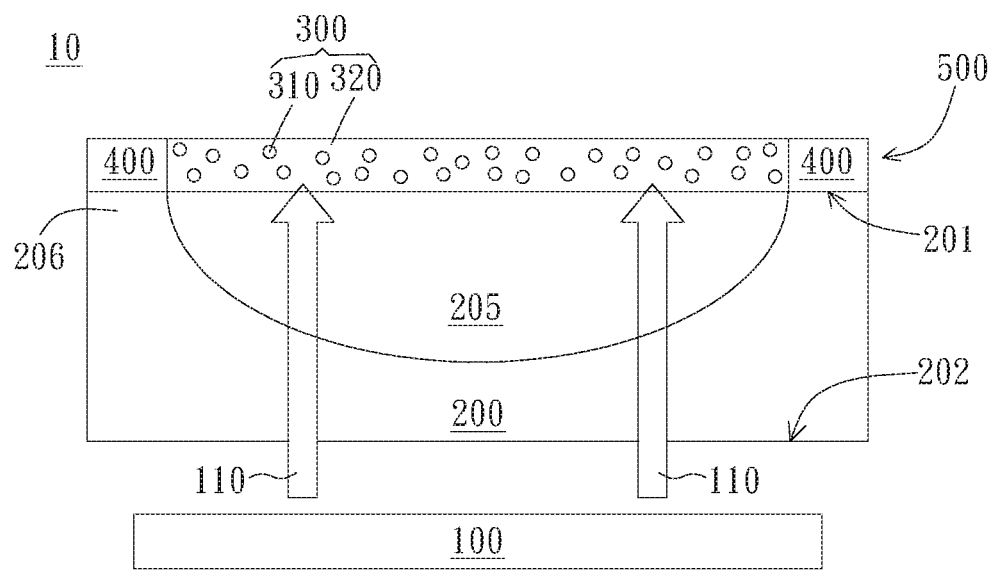
FIG. 1B is an enlarged schematic diagram of an area A in FIG. 1A.

The following describes a display device in an embodiment of the present invention with reference to FIG. 1A and FIG. 1B.

Referring to FIG. 1A, according to an embodiment of the present invention, the display device 10 includes a first chromatic light source 100 configured to generate first chromatic light 110, a dichroic reflection layer 200 disposed on a light emergent side of the first chromatic light source 100 and allowing the first chromatic light 110 to pass through, and a quantum dot layer 500 including quantum dot blocks 300.

Specifically, according to a preferred embodiment of the present invention, as shown in FIG. 1A, the quantum dot layer 500 includes the quantum dot blocks 300. The dichroic reflection layer 200 includes a plurality of recessed portions 205. The plurality of quantum dot blocks 300 is disposed corresponding to the plurality of recessed portions 205. The quantum dot block 300 receives the first chromatic light 110 passing through the dichroic reflection layer 200. Referring to FIG. 1B, FIG. 1B is an enlarged schematic diagram of an area A in FIG. 1A. The quantum dot block 300 includes at least one quantum dot 310. That is, there may be one or more quantum dots 310 distributed in the quantum dot block 300. An area other than the quantum dot 310 in the quantum dot block 300 may be filled with a filling material 320 such as a photoresist or a protective material. However, the present invention is not limited thereto. Alternatively, the area other than the quantum dot 310 in the quantum dot block 300 may be filled with any filling material conforming to the intention of the present invention.

Referring to FIG. 1B, the dichroic reflection layer 200 has a first surface 201 facing away from the first chromatic light source 100 and a second surface 202 facing toward the first chromatic light source 100. Recessed portions 205 that are recessed toward the first chromatic light source 100 are formed on the first surface 201. The quantum dot blocks 300 are disposed corresponding to the recessed portions 205. For example, the recessed portion 205 may be of a shape of a recessed bowl. However, this is merely an example, and the present invention is not limited thereto.

In the display device 10, the first chromatic light source 100 may a light source particularly emitting the first chromatic light 110. For example, the first chromatic light 110 may be chromatic light whose emission spectrum peak falls between 450 nm and 470 nm. That is, the first chromatic light 110 may be blue light.

When the first chromatic light 110 is blue light, the display device 10 may include a quantum dot block 300 that emits red light or green light. Specifically, the quantum dot block 300 may include a quantum dot 310 that emits red light after being excited by blue light, and/or may include a quantum dot 310 that emits green light after being excited by blue light. Therefore, the display device 10 may generate light of a required color, for example, white light, through a combination of the blue light of the first chromatic light 110 and the red light and the green light that are emitted by the quantum dots 310. However, according to another embodiment of the present invention, the quantum dot layer 500 may include one or more quantum dot blocks that emit different chromatic light after being excited by light, and the first chromatic light 110 may be chromatic light other than blue light. Therefore, an emitted color corresponding to the display device 10 may be designed and determined according to the first chromatic light 110 and a type of the quantum dot 310, and the present invention is not limited to the embodiment stated herein.

In the display device 10, the dichroic reflection layer 200 may at least partially transmit the first chromatic light 110. According to an embodiment of the present invention, the dichroic reflection layer 200 may selectively allow the first chromatic light 110 to pass through, and at least partially reflect light other than the first chromatic light 110. That is, the dichroic reflection layer 200 may have different transmission properties, refractive features, and reflective features for different light.

Figure 2:
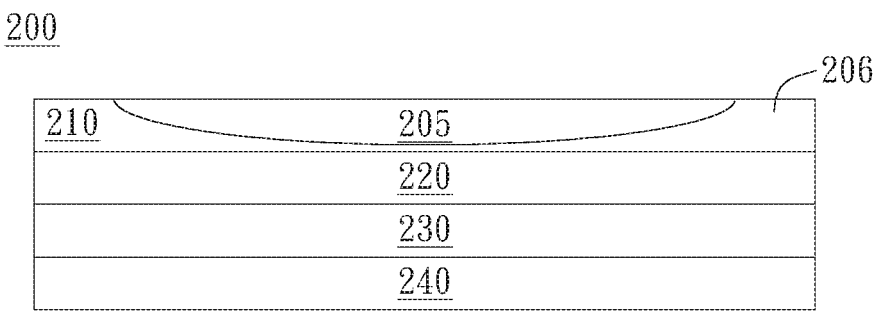
FIG. 2 is a schematic structural diagram of a dichroic reflection layer according to the first embodiment of the present invention.

To be specific, referring to FIG. 1A, FIG. 1B, and FIG. 2, the dichroic reflection layer 200 may include, for example, a substrate 240 and a plurality of layers 210, 220, and 230 stacked on the substrate 240. Because each layer has a different property, light of a particular wavelength (or color) is differently refracted or reflected when passing through the layers based on the design. Therefore, light of a particular target wavelength can pass through the dichroic reflection layer 200, and light other than the light of the particular target wavelength cannot pass through the dichroic reflection layer 200 or passes through the dichroic reflection layer 200 limitedly.

According to a preferred embodiment, the layers 210, 220, and 230 and the substrate 240 of the dichroic reflection layer 200 may be transparent, so that a transmission rate of light of a particular target wavelength (such as blue light) can be increased. It should be noted that the stacked structure and the number of stacked layers of the dichroic reflection layer 200 shown herein are merely examples, and the present invention is not limited thereto. That is, the stacked structure and the number of layers of the dichroic reflection layer 200 may be adjusted according to light of a particular target wavelength.

According to a preferred embodiment of the present invention, when the dichroic reflection layer 200 is of a multi-layer stacked structure, to avoid damaging selectivity on particular target wavelengths, a depth of the recessed portion 205 is preferably not greater than a thickness of the layer 210 (the first layer) in the dichroic reflection layer 200. That is, the recessed portion 205 does not extend to reach the layer 220 (the second layer) in the dichroic reflection layer 200, so as to maintain a capability of the dichroic reflection layer 200 for selection of light of a particular target wavelength by passing light through the layers having different features sequentially. However, the present invention is not limited thereto.

Referring to FIG. 1A, FIG. 1B, and FIG. 2, in this embodiment, the dichroic reflection layer 200 includes a plurality of protruding walls 206 respectively located between the neighboring recessed portions 205. Based on the above, the recessed portion 205 may be formed by removing a part of the layer 210. In addition, as shown in FIG. 1A and FIG. 1B, the quantum dot layer 500 includes one or more quantum dot blocks 300 and one or more blocking portions 400. The blocking portion 400 is located between the neighboring quantum dot blocks 300, and the blocking portion 400 abuts against a top portion of the protruding wall 206.

According to the foregoing embodiment, the following description is given mainly by using an example in which the first chromatic light 110 is blue light. To be more specific, light of a particular wavelength that can pass through the dichroic reflection layer 200 is blue light. Other light including at least green light or red light is reflected by the dichroic reflection layer 200. However, the present invention is not limited thereto.

Figure 3:
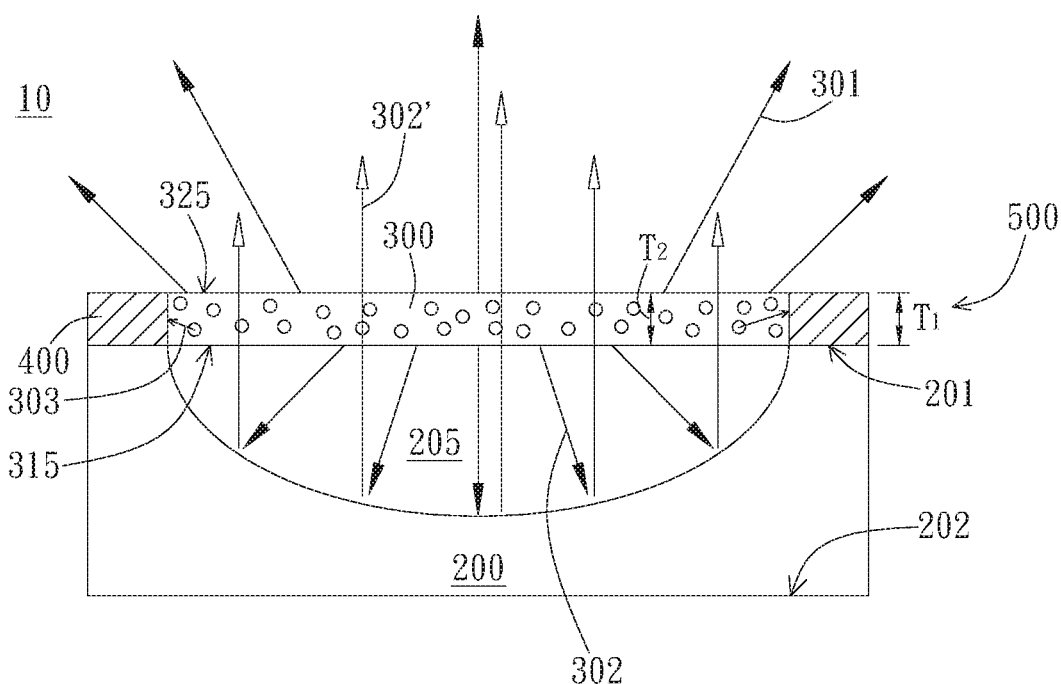
FIG. 3 is a schematic diagram showing that light in a display device is reflected and centralized according to the first embodiment of the present invention.

FIG. 3 is a schematic diagram showing that light in a display device 10 is reflected and centralized according to an embodiment of the present invention. In this embodiment, an implementation of improving light emission efficiency by using a recessed portion 205 in the display device 10 is described. FIG. 3 is an enlarged schematic diagram of an area A in FIG. 1A. Herein, for brevity and clarity, a part of the structure is omitted in the figure. Moreover, an absolute proportion and a relative proportion of the figure shown herein do not represent actual proportions.

Referring to FIG. 3, after a quantum dot block 300 is excited by first chromatic light (not shown), quantum dots 310 substantially transmit light divergently to all directions. Specifically, the quantum dot block 300 has a light receiving surface 315 that faces toward a dichroic reflection layer 200 to receive the first chromatic light and a light emergent surface 325 that is opposite to the light receiving surface 315. After being excited, the quantum dot block 300 can transmit light 301 in a direction away from the dichroic reflection layer 200, and transmit light 302 by facing toward the dichroic reflection layer 200. In addition, a part of light 303 emitted by the quantum dot 310 is likely to be transmitted toward a blocking portion 400, and cannot be transmitted out due to blocking of the blocking portion 400.

Herein, the transmitted light 301, 302, and/or 303 may be chromatic light other than the first chromatic light. For example, the light 301, 302, and/or 303 may be second chromatic light other than the first chromatic light. According to an embodiment of the present invention, the second chromatic light may be red light and/or green light. More specifically, the second chromatic light may be light of 630±20 nm, and/or the second chromatic light may be light of 530±20 nm. However, the foregoing is merely examples, and the present invention is not limited thereto.

To assuredly block out light 303 that is likely to degrade display quality, the blocking portion 400 of the display device 10 may be, for example, a black matrix, and may be of a same height as the quantum dot block 300 to further improve the effect of blocking out the light 303. That is, the blocking portion 400 may have a first thickness T1, the quantum dot block 300 may have a second thickness T2, and the first thickness T1 is not less than the second thickness T2. However, the foregoing is merely an example, and the present invention is not limited thereto.

The light 301 is divergently transmitted in a direction facing away from the dichroic reflection layer 200, so that the display device 10 according to this embodiment of the present invention has a display effect of a wide angle of view. Further, the light 302 is divergently transmitted in a direction toward the dichroic reflection layer 200. Because the dichroic reflection layer 200 can reflect light other than the first chromatic light, light reflected by the dichroic reflection layer 200 at the recessed portion 205 approaches the front angle of view. Therefore, most light emitted by the display device 10 is substantially transmitted outward from the light emergent surface 325 through settings of the quantum dot layer 500 and the dichroic reflection layer 200, thereby improving light emission efficiency. In addition, reflected light 302' of the light 302 substantially approaches the front angle of view, so that light intensity of the front angle of view of the display device 10 can be further improved. That is, according to the display device 10 in this embodiment of the present invention, the light emission efficiency and the light intensity of the front angle of view can be further improved while maintaining the advantage of a wide angle of view.

To enable the reflected light 302' to be centralized toward the front angle of view as much as possible, the structure of the recessed portion 205 of the dichroic reflection layer 200 may be designed according to requirements. For example, a curvature of the recessed portion 205, a thickness of the quantum dot block 300, and the like may be determined according to a position of a light focus, required light intensity, an expected reflecting direction, and the like that needs to be designed.

Next, an embodiment of setting a relative ratio of a quantum dot block to a recessed portion will be described with reference to FIG. 4A and FIG. 4B.

Figure 4A:
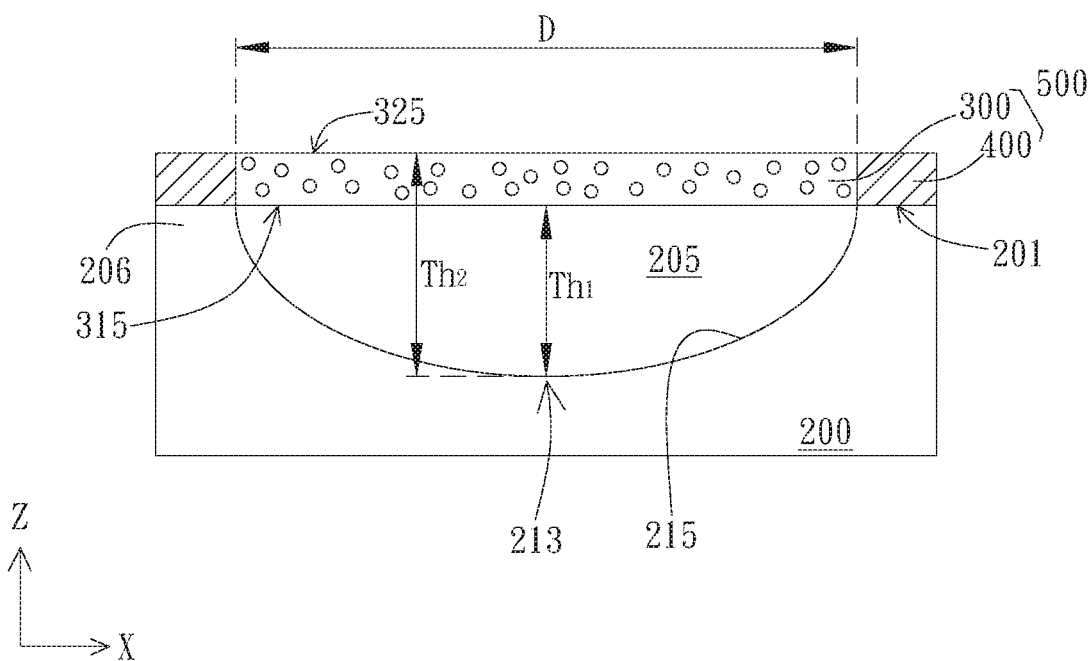
FIG. 4A is a schematic diagram of a size corresponding to a recessed portion in a display device according to the first embodiment of the present invention.

First, FIG. 4A is a cross-sectional view of a recessed portion 205 of a display device in a direction (a direction Z) perpendicular to a first surface 201 according to an embodiment of the present invention. In the cross-sectional view in this embodiment, a quantum dot block 300 has a minor-axis width D in a transverse direction parallel to the first surface 201, and the recessed portion 205 has a recessed bowl-shaped surface 215.

Figure 4B:
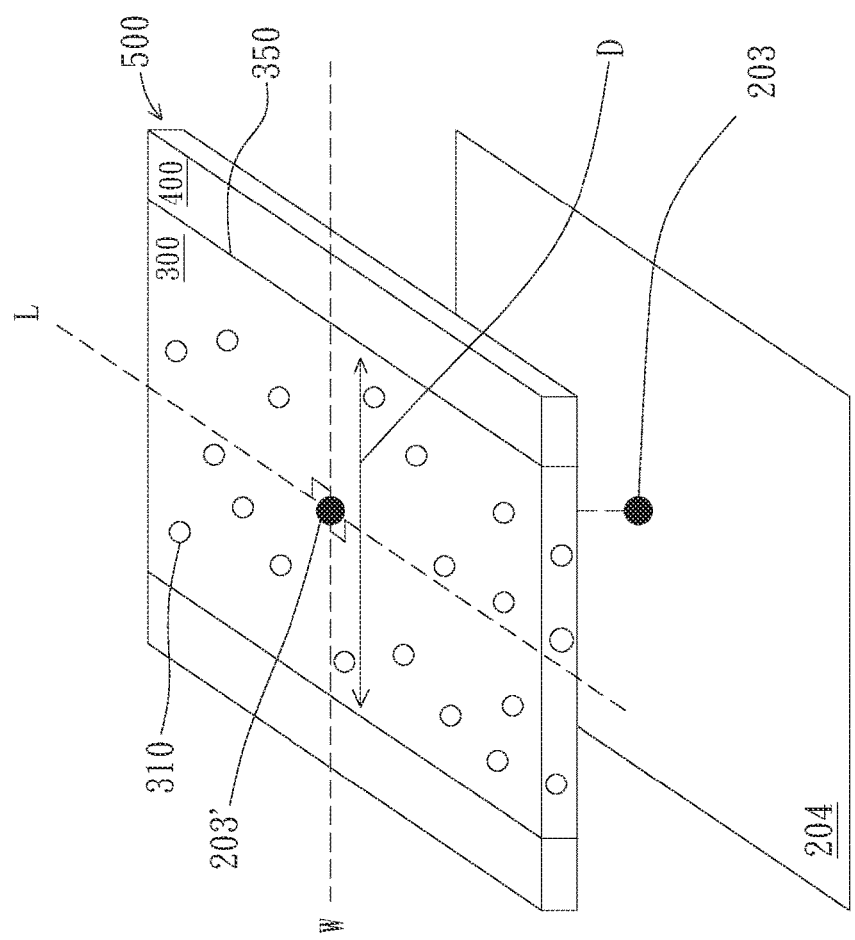
FIG. 4B is a schematic oblique view of a quantum dot block defined by a minor-axis width D in FIG. 4A.

Herein, referring to FIG. 4B, when a schematic top oblique view of the quantum dot block 300 corresponding to the recessed portion 205 and blocking portions 400 on two sides of the quantum dot block 300 is referred, an end point 203 of a deepest bottom portion of the recessed portion 205 falls onto an imaginary plane 204 substantially parallel to the quantum dot layer 500. The end point 203 is perpendicularly projected onto the quantum dot block 300, so that an imaginary end point 203' can be obtained. In this embodiment, a boundary 350 exists between the quantum dot block 300 and the blocking portion 400. An axis parallel to the boundary 350 and passing through the imaginary end point 203' is defined as a major axis L. An axis perpendicular to the major axis L and passing through the imaginary end point 203' is defined as a minor axis W. The minor-axis width D shown in FIG. 4A is the width of the minor axis W on the quantum dot block 300 between the blocking portions 400.

Still referring to FIG. 4A, according to a preferred embodiment of the present invention, a cross-sectional shape of the recessed bowl-shaped surface 215 on a cross section perpendicular to the first surface 201 is a parabola. Further, according to another preferred embodiment of the present invention, a perpendicular distance Th1 between the deepest bottom portion 213 of the recessed bowl-shaped surface 215 and a light receiving surface 315 is not greater than ¼ of the minor-axis width D, and a perpendicular distance Th2 between the deepest bottom portion 213 of the recessed bowl-shaped surface 215 and a light emergent surface 325 is not less than ¼ of the minor-axis width D. For example, the perpendicular distance Th1 between the bottom portion 213 of the recessed bowl-shaped surface 215 and the light receiving surface 315 may be 0.9*D/4, and the perpendicular distance Th2 of the bottom portion 213 of the recessed bowl-shaped surface 215 and the light emergent surface 325 may be 1.1*D/4, but the present invention is not limited thereto.

To be specific, when the recessed bowl-shaped surface 215 of the recessed portion 205 is a paraboloid, according to a parabola formula $X^2=4CY$, a focusing distance C is ¼ of the minor-axis width of this width. Correspondingly, to enable a focus of the paraboloid to fall within a thickness of the quantum dot block 300, it is preferable to enable the perpendicular distance Th1 between the bottom portion 213 of the recessed bowl-shaped surface 215 and the light receiving surface 315 to be not greater than ¼ of the minor-axis width D, and the perpendicular distance Th2 between the bottom portion 213 of the recessed bowl-shaped surface 215 and the light emergent surface 325 to be not less than ¼ of the minor-axis width D. In this way, the focus of the recessed bowl-shaped surface 215 falls within the thickness of the quantum dot block 300. Therefore, after light emitted by the excited quantum dot 310 arrives at the recessed bowl-shaped surface 215, the light is reflected in a direction relatively close to the front angle of view. However, the foregoing is merely an example, and the perpendicular distance Th1 between the bottom portion 213 of the recessed bowl-shaped surface 215 and the light receiving surface 315 or the perpendicular distance Th2 between the bottom portion 213 of the recessed bowl-shaped surface 215 and the light emergent surface 325 may be determined according to factors such as chromatic light reflectivity that needs to be achieved and an actual reflection capability of the dichroic reflection layer 200. In addition, the recessed bowl-shaped surface 215 of the recessed portion 205 may be of a shape other than the paraboloid, for example, a hemisphere or an oval hemisphere; and the focusing distance, the reflectivity, the thickness, the depth, and the like are modified and adjusted accordingly. That is, relative shapes and relative proportions of the recessed portion 205 and the quantum dot block 300 in the embodiments shown in FIG.

4A and FIG. 4B are merely examples, and the present invention is not limited thereto.

In the foregoing embodiment, a state in which the quantum dot layer 500 is directly attached to the first surface 201 and the blocking portions 400 are respectively attached to the top portions of the protruding walls 206 is described. However, according to another embodiment of the present invention, another intermediate layer may be disposed between the quantum dot layer 500 and the dichroic reflection layer 200, and a thickness of other intermediate layer may be correspondingly calculated as required.

Figure 5A:
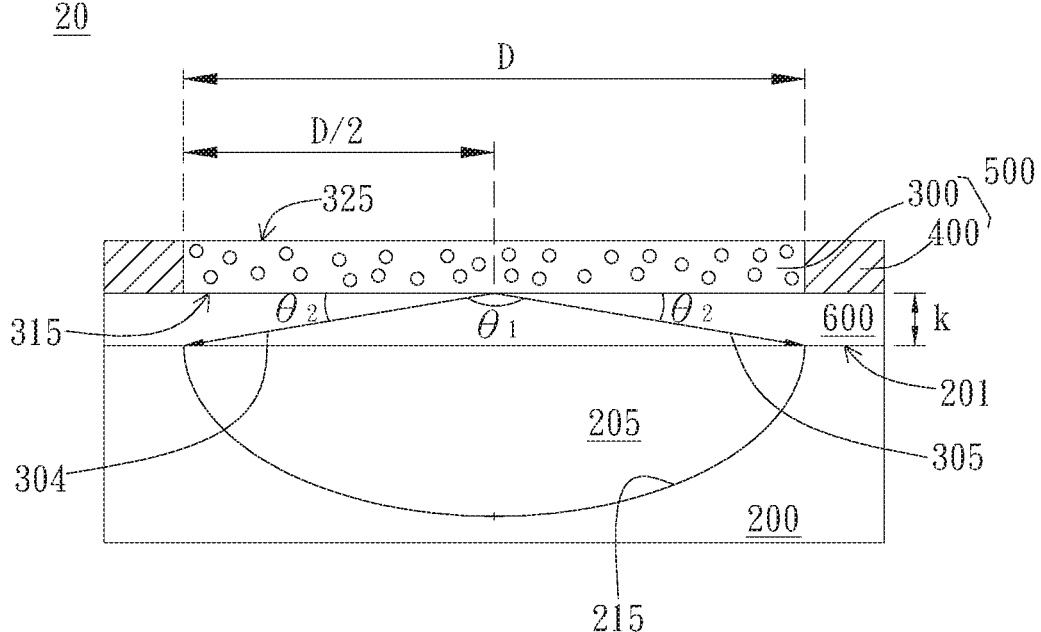
FIG. 5A and FIG. 5B are schematic diagrams of a display device according to a modified embodiment of the first embodiment of the present invention.
Figure 5B:
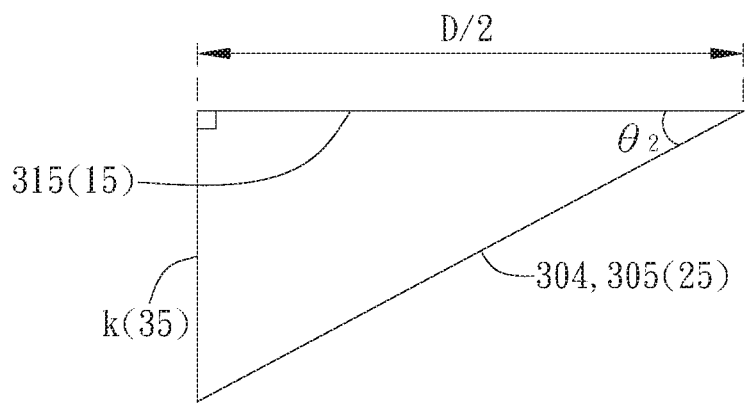

FIG. 5A and FIG. 5B are schematic diagrams of a display device 20 according to a modified embodiment of the first embodiment of the present invention. FIG. 5A and FIG. 5B are schematic diagrams of a layer thickness that may exist between the dichroic reflection layer 200 and the quantum dot layer 500 when one or more intermediate layers 600 are disposed between the quantum dot layer 500 and the dichroic reflection layer 200.

Referring to FIG. 5A, one or more intermediate layers 600 that are partially transparent may be disposed between the quantum dot layer 500 and the dichroic reflection layer 200. For example, the one or more intermediate layers 600 may include a combination of one or more of a polarizer, an insulation layer, a protective layer, an indium tin oxide layer, and the like, and the present invention is not limited to the examples shown herein.

Based on the above, referring to FIG. 5A, because of the existence of the intermediate layer 600, a part of light transmitting toward the dichroic reflection layer 200 cannot be reflected by the dichroic reflection layer 200 on the recessed bowl-shaped surface 215. Specifically, light within an angle $\theta_1$ between light 304 and 305 transmitted to an edge of the recessed bowl-shaped surface 215 can be reflected by the dichroic reflection layer 200, and light within an angle $\theta_2$ between the light 304 and the light receiving surface 315 or between the light 305 and the light receiving surface 315 cannot be reflected by the dichroic reflection layer 200. Consequently, a light leakage is likely to be caused, and light emission efficiency is reduced. Therefore, preferably, to control the light leakage under a rate, the thickness of the intermediate layer 600 needs to be controlled.

For example, if it is expected that a light leakage rate of light transmitted toward the dichroic reflection layer 200 is less than 10%, an angle occupied by the light leakage of the light transmitted toward the dichroic reflection layer 200 should be less than 10%. That is, an angle (the sum of the two angles $\theta_2$) occupied by the light leakage in a 180-degree angle (a sum of one angle $\theta_1$ and two angles $\theta_2$ is 180 degrees) occupied by the light transmitted to the dichroic reflection layer 200 should be less than 10% of 180 degrees, to be specific, 18 degrees. Therefore, the angle $\theta_2$ is preferably less than 9 degrees.

Referring to FIG. 5B in conjunction with FIG. 5A, when the angle $\theta_2$ is 9 degrees (that is, the light leakage rate is equal to 10%), the light receiving surface 315 (an adjacent side 15) and the light 304 or 305 (a hypotenuse 25) that form the angle $\theta_2$, and the thickness k (an opposite side 35) of the intermediate layer 600 may collectively form an imaginary right triangle. Therefore, the thickness k of the intermediate layer 600 may be deduced by using the imaginary right triangle. To be specific, in the right triangle, the opposite side, the adjacent side, and the hypotenuse are defined based on the angle $\theta 2$ which is not the right angle. The thickness k (the opposite side 35) of the intermediate layer 600 may be deduced by using a formula, tan θ=the opposite side/the adjacent side, of the right triangle. That is, the thickness k (the opposite side) of the intermediate layer $600=\tan(\theta 2)\times$ the length (the adjacent side 15) corresponding to the light receiving surface 315. Herein, it may be defined that the quantum dot block 300 has a minor-axis width D in a transverse direction parallel to the first surface 201 as illustrated in FIG. 4A and FIG. 4B. In the right triangle, the length (the adjacent side 15) corresponding to the light receiving surface 315 is half of the minor-axis width D. Based on the above, the thickness k (the opposite side 35) of the intermediate layer 600 tan 9°×(D/2). It may be deduced that the thickness k (the opposite side 35) needs to be approximately less than D/12 to satisfy the requirement that the light leakage rate is less than 10%. However, this is merely an example. According to another embodiment of the present invention, when it is required that the light leakage rate is less than 7%, it may be deduced, in the foregoing deduction manner, that the thickness k of the intermediate layer 600 needs to be approximately less than D/18, and the present invention is not limited thereto.

In addition, the foregoing deduction process is merely an example. The thickness k of the intermediate layer 600 may be deduced by using another defined equation. For example, the thickness k of the intermediate layer 600 in the imaginary right triangle may be deduced by using an angle other than the angle $\theta_2$. In this case, the opposite side, the adjacent side, and the hypotenuse should be correspondingly defined and used. Based on the above, the present invention is not limited to the deduction process specifically shown herein.

In addition, according to some embodiments of the present invention, the intermediate layer 600 may not exist between the quantum dot layer 500 and the first surface 201. Instead, a distance exists between the quantum dot layer 500 and the first surface 201. A manner for calculating the distance may be substantially the same as the manner for calculating the thickness k of the intermediate layer 600. That is, the quantum dot layer 500 is spaced away from the first surface 201 for a distance (without the intermediate layer 600), and when it is required that the light leakage rate should be lower than 10%, the distance should be not greater than 1/12 of the minor-axis width D of the quantum dot block 300. Further, according to a preferred embodiment of the present invention, when it is required that the light leakage rate is lower than 7%, the distance should be not greater than 1/18 of the minor-axis width D. However, the present invention is not limited thereto. A size of the distance may be determined based on factors such as expected display quality, and the intermediate layer that needs to be disposed due to a functional or structural requirement or restriction.

Figure 6:
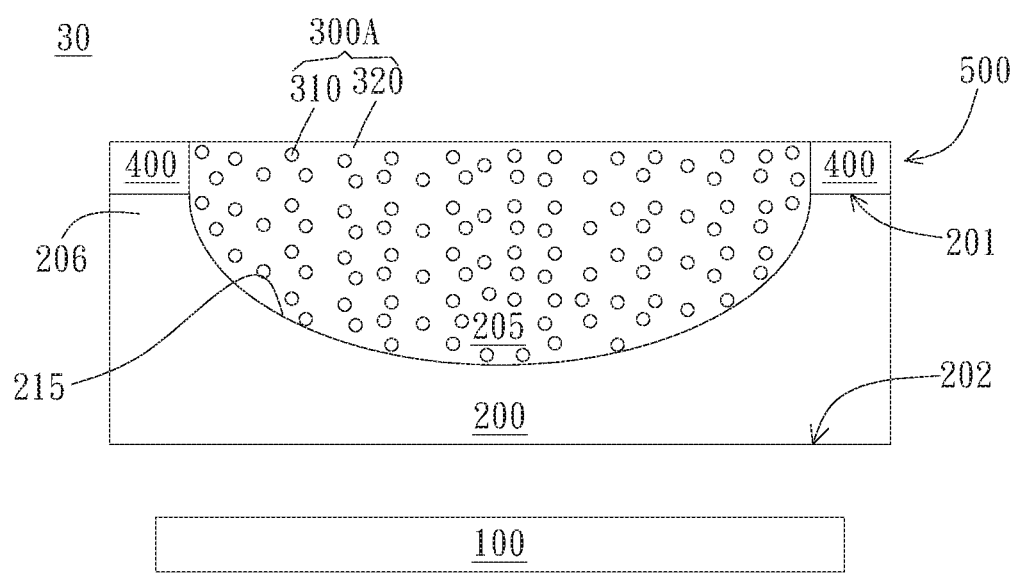
FIG. 6 is a schematic diagram of a display device according to another modified embodiment of the first embodiment of the present invention.

Next, FIG. 6 is a schematic diagram of a display device 30 according to another modified embodiment of the first embodiment of the present invention. It should be noted that element numerals and a part of content of the embodiments of FIG. 1A and FIG. 1B are still used in the embodiment of FIG. 6. Same or similar numerals are used to represent same or similar elements, and a description of same technical content is omitted. For the omitted description, please refer to the foregoing embodiments, and the details are not redundantly described in the following embodiments.

The display device 30 in the present invention and the display device 10 in the embodiments shown in FIG. 1A and FIG. 1B differ in that a quantum dot block 300A is at least partially filled into a recessed portion 205. Specifically, the recessed portion 205 of the display device 10 in the embodiments shown in FIG. 1A and FIG. 1B forms a cavity. To be more specific, the recessed bowl-shaped surface 215 of the recessed portion 205 and the quantum dot block 300 collectively define a cavity. The cavity is not filled with any material. In the display device 30 in the embodiment shown in FIG. 6, the quantum dot block 300A may be at least partially filled into the recessed portion 205, and is in contact with the recessed bowl-shaped surface 215. However, the foregoing is merely an example, and the present invention is not limited thereto.

If the quantum dot block 300A is at least partially filled into the recessed portion 205, there are advantages such as simplifying a preparation process, avoiding moisture permeation, reinforcing support of the quantum dot layer 500, and reducing the number of layers of different mediums passed through by light. However, the foregoing is merely an example, and the present invention is not limited thereto.

Figure 7A:
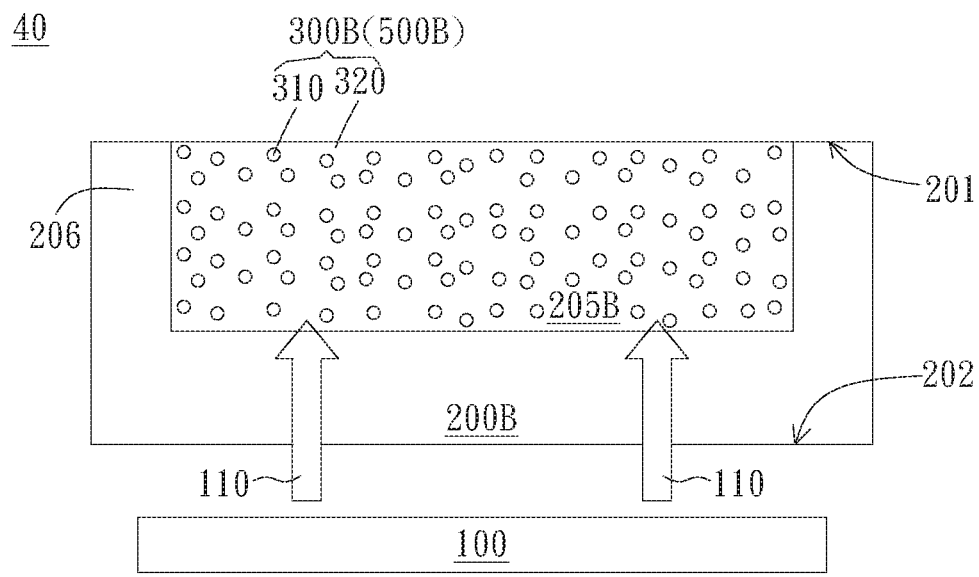
FIG. 7A and FIG. 7B are schematic diagrams of a display device according to the second embodiment of the present invention.
Figure 7B:
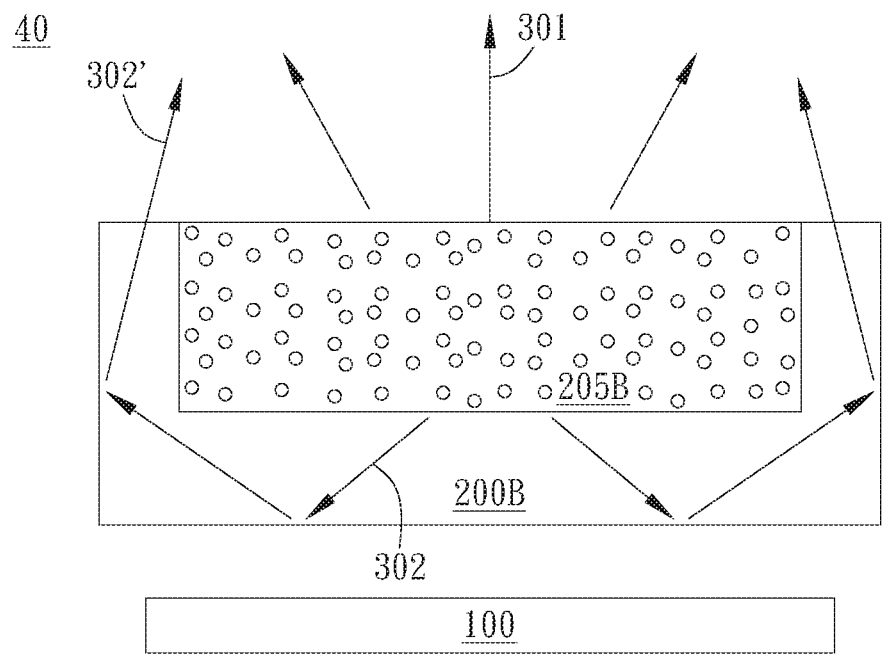

FIG. 7A and FIG. 7B are schematic diagrams of a display device 40 according to the second embodiment of the present invention. It should be noted that element numerals and a part of content of the embodiment of FIG. 1A and FIG. 1B are still used in the embodiments of FIG. 7A and FIG. 7B. Same or similar numerals are used to represent same or similar elements, and a description of same technical content is omitted. For the omitted description, please refer to the foregoing embodiments, and details are not redundantly described in the following embodiments.

As shown in FIG. 7A, in this embodiment, the display device 40 includes: a first chromatic light source 100 configured to generate first chromatic light 110, a dichroic reflection layer 200B disposed on a light emergent side of the first chromatic light source 100, and a quantum dot layer 500B including a plurality of quantum dot blocks 300B. The quantum dot blocks 300B receive the first chromatic light 110 through the dichroic reflection layer 200B. The dichroic reflection layer 200B allows the first chromatic light 110 to pass through, and has a first surface 201 facing away from the first chromatic light source 100. One or more recessed portions 205B are formed on the first surface 201, and one or more quantum dot blocks 300B respectively correspond to the recessed portions 205B and are directly disposed in the recessed portions 205B. Therefore, in this embodiment, the quantum dot blocks 300B of the display device 40 are substantially surrounded by the dichroic reflection layer 200B. Specifically, the dichroic reflection layer 200B includes a plurality of protruding walls 206 respectively between one or more recessed portions 205B, and one or more quantum dot blocks 300B are respectively filled into one or more recessed portions 205B and are surrounded by the protruding walls 206. In this case, the quantum dot layer 500B is a layer including one or more quantum dot blocks 300B.

In this embodiment, referring to FIG. 7B in conjunction with FIG. 7A, after the display device 40 is excited by the first chromatic light 110, quantum dots 310 can emit excited light 301 transmitted away from the first chromatic light source 100, and can emit excited light 302 transmitted toward the first chromatic light source 100. However, the dichroic reflection layer 200B wrapping the quantum dot block 300B is selective for light. In addition to the first chromatic light 110, the dichroic reflection layer 200B may selectively not allow light other than the first chromatic light 110 to pass through, or may only allow light other than the first chromatic light 110 to pass through limitedly. For example, a second chromatic light cannot pass through the dichroic reflection layer 200B, or can only pass through the dichroic reflection layer 200B limitedly, Therefore, when the excited light 302 is the second chromatic light, the light 302 may not pass through the dichroic reflection layer 200B or only pass through the dichroic reflection layer 200B limitedly. That is, the light 302 may be guided to the front angle of view at the dichroic reflection layer 200B. Thereby, the light intensity of the front angle of view is improved by the reflected light 302' while the light 301 serves to fulfill a wide angle of view.

As shown in FIG. 7A and FIG. 7B, different from the recessed portion 205 having the recessed bowl-shaped surface in FIG. 1A and FIG. 1B, in the recessed portion 205B of this embodiment, the recessed portion 205B is of a rectangular structure having a clear boundary and recessed square corner, so that light other than the first chromatic light trapped in the dichroic reflection layer 200B may be guided to the front angle of view. Based on the above, to form the recessed portion 205B of the rectangular structure having the clear boundary and recessed square corner, the recessed portion 205B is preferably formed through anisotropic dry etching. On the contrast, to form the recessed portion 205 including a substantial smooth curved surface shown in FIG. 1A and FIG. 1B, the recessed portion 205 is preferably formed through isotropic wet etching. However, the foregoing is merely an example, and the recessed portion 205B in this embodiment may be manufactured by using any available process or method.

Although no special description is given herein, it should be noted that the recessed portion 205B in the embodiments shown in FIG. 7A and FIG. 7B is the same as that in other of the foregoing embodiments. When the dichroic reflection layer 200B is formed from a plurality of stacked layers having different refractive indexes and reflectivity, the recessed portion 205B should be etched only to a first layer of the dichroic reflection layer 200B and cannot be etched to a second layer of the dichroic reflection layer 200B, so as to avoid damaging selectivity of wavelengths of the dichroic reflection layer 200B.

Hereafter, a display device including a dichroic reflection layer and a recessed portion in other application examples will be further described with reference to FIG. 8 to FIG. 11.

Example 1

Figure 8:
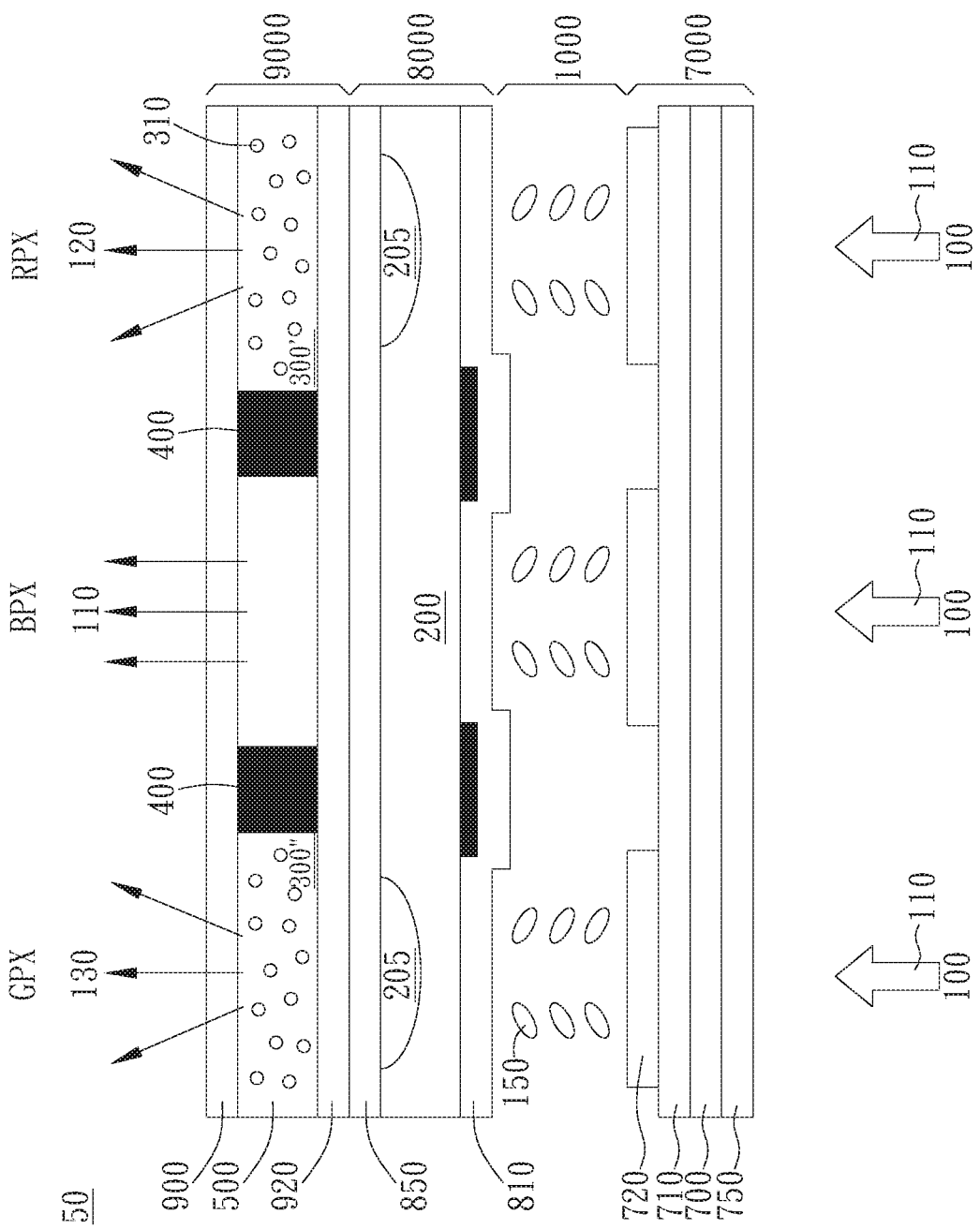
FIG. 8 is a schematic diagram of a display device according to an application example of the present invention.

An embodiment according to Example 1 is shown in FIG. 8, a display device 50 including a dichroic reflection layer 200 and a quantum dot layer 500 is a liquid crystal display device having three layers of substrates (for example, glass). Specifically, a first structural portion 7000, a display medium layer 1000, a second structural portion 8000, and a third structural portion 9000 may be sequentially disposed on a light emergent side of a first chromatic light source 100 emitting first chromatic light 110.

To be specific, the first structural portion 7000 may be provided with a first substrate 700, a control circuit layer 710 disposed on the first substrate 700, a plurality of pixel electrodes 720, and a polarizer 750. The control circuit layer 710 includes at least a plurality of transistors (not shown) arranged as an array, a data line (not shown), and a scanning line (not shown). However, the present invention is not limited thereto. Next, the display medium layer 1000 may be disposed on the first structural portion 7000. The display medium layer 1000 includes, for example, liquid crystal molecules 150.

Next, the second structural portion 8000 may be disposed on the display medium layer 1000. To be specific, the second structural portion 8000 may be sequentially provided with a common electrode layer 810, a dichroic reflection layer 200, and a polarizer 850. In this embodiment, for a structure of the dichroic reflection layer 200, refer to FIG. 2. The dichroic reflection layer 200 includes a substrate 240 and a plurality of layers stacked on the substrate 240. The dichroic reflection layer 200 may be of a structure sequentially stacking a plurality of layers having different refractive indexes and reflectivity. In addition, the dichroic reflection layer 200 includes recessed portions 205. In this embodiment, the dichroic reflection layer 200 is used as an example, but the present invention is not limited thereto. The dichroic reflection layer may be either of the dichroic reflection layer 200 or the dichroic reflection layer 200B described in the foregoing embodiments upon there is no conflict. For example, when the first chromatic light 110 is blue light, a part of the dichroic reflection layer 200 corresponding to red subpixels RPX and green subpixels GPX may be provided with recessed portions 205 to centralize red light and green light emitted from excited quantum dots. However, the present invention is not limited thereto, and may also include a combination of light of other colors. In addition, provided that the dichroic reflection layer 200 and the recessed portion 205 are provided, the second structural portion 8000 may not include the common electrode layer 810 and the polarizer 850, or may further include another structure.

Next, the third structural portion 9000 may be further stacked on the second structural portion 8000. Specifically, the third structural portion 9000 may include a protective layer 920, a quantum dot layer 500, and a third substrate 900. As described in any of the foregoing embodiments, the quantum dot layer 500 may include quantum dot blocks emitting different chromatic light. For example, the quantum dot layer 500 may include a quantum dot block 300' that can emit red light after being excited by blue light, and a quantum dot block 300" that can emit green light after being excited by blue light, so that the display device 50 includes red subpixels RPX, green subpixels GPX, and blue subpixels BPX. A portion provided with the blue subpixels BPX does not need to be provided with any quantum dot block or recessed portion. However, the foregoing is merely an example, and the third structural portion 9000 may include another structure and a quantum dot block that defines subpixels of various colors.

Based on the above, the display device 50 includes the first substrate 700 and the display medium layer 1000, the first substrate 700 is disposed between the first chromatic light source 100 and the dichroic reflection layer 200, and the display medium layer 1000 is disposed between the first substrate 700 and the dichroic reflection layer 200. In addition, the display device 50 further includes the polarizer 850 and the protective layer 920 that are disposed between the dichroic reflection layer 200 and the quantum dot layer 500. Further, available thicknesses of the polarizer 850 and the protective layer 920 that are disposed between the dichroic reflection layer 200 and the quantum dot layer 500 may be determined according to the embodiments described with reference to FIG. 5A and FIG. 5B.

According to Example 1, the display device 50 may include a structure provided with three layers of substrates (the first substrate 700, the substrate 240 of the dichroic reflection layer 200, and the third substrate 900), and the three layers of substrates may be preferably made of glass. According to this structure, the first chromatic light 110 emitted by the first chromatic light source 100 may sequentially pass through the first structural portion 7000, the display medium layer 1000 performing adjustment and determining whether light can pass therethrough, and the dichroic reflection layer 200, and is incident to the quantum dot layer 500. Because subpixels (for example, the blue subpixels BPX) correspondingly emitting the first chromatic light 110 are not provided with any quantum dot block, the first chromatic light 110 may be emitted in said subpixels. On the contrast, after the first chromatic light 110 is incident to the quantum dot block 300' or 300", because quantum dots 310 respectively emit different chromatic light through excitation, second chromatic light 120 (for example, red light) and third chromatic light 130 (for example, green light) are respectively emitted after being centralized by the recessed portions 205. Therefore, the display device 50 that can emit a plurality of specific colors of chromatic light and arrange and combine the chromatic light to emit other colors of chromatic light can be formed.

Example 2

Figure 9:
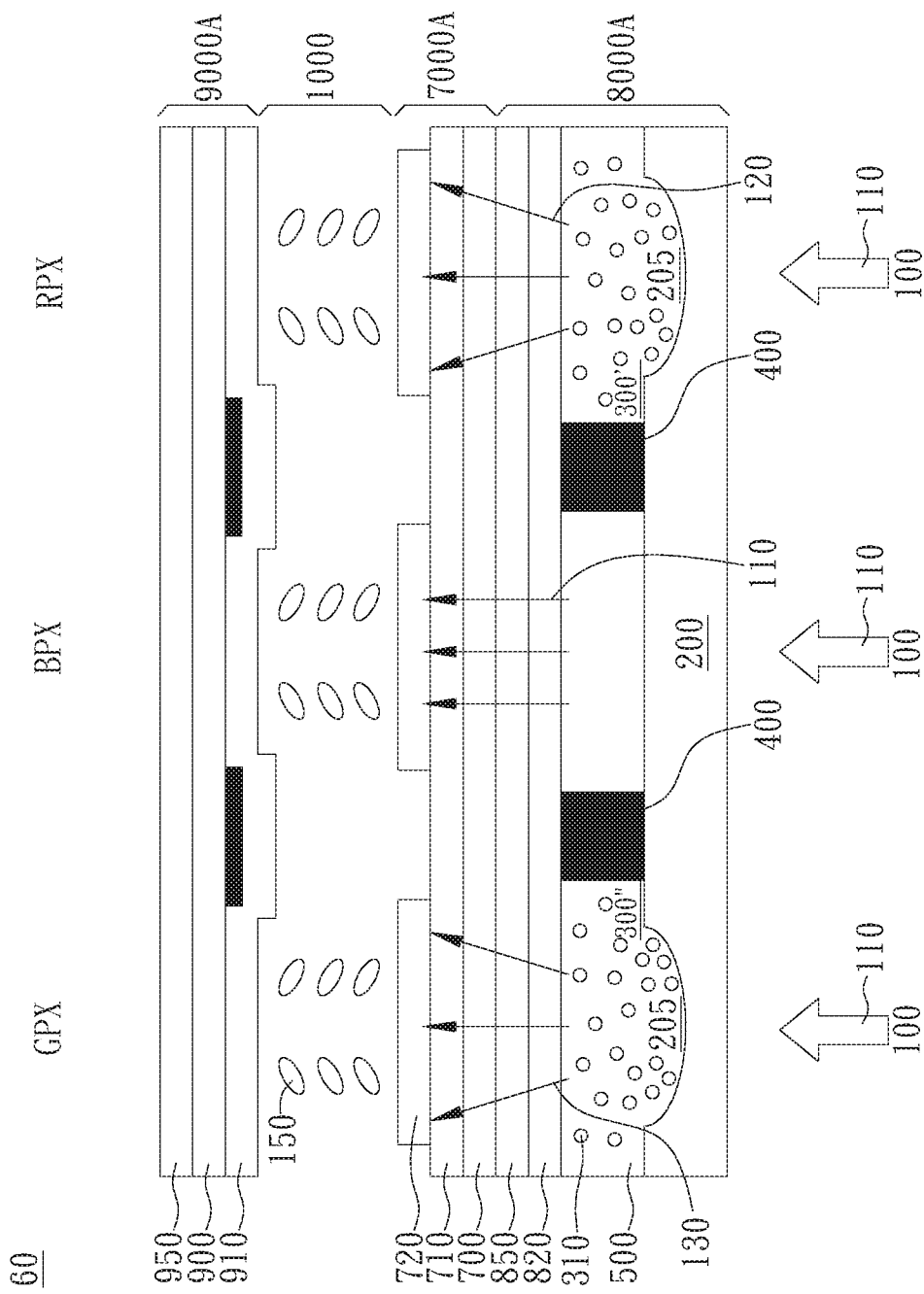
FIG. 9 is a schematic diagram of a display device according to another application example of the present invention.

An embodiment according to Example 2 is shown in FIG. 9, a display device 60 including a dichroic reflection layer 200 and a quantum dot layer 500 is a liquid crystal display device having three layers of substrates. A second structural portion 8000A, a first structural portion 7000A, a display medium layer 1000, and a third structural portion 9000A may be sequentially disposed on a light emergent side of a first chromatic light source 100 emitting first chromatic light 110.

The second structural portion 8000A may include a dichroic reflection layer 200, a quantum dot layer 500, a protective layer 820, and a polarizer 850. In this embodiment, for a structure of the dichroic reflection layer 200, refer to FIG. 2. The dichroic reflection layer 200 includes a substrate 240 and a plurality of layers stacked on the substrate 240. The dichroic reflection layer 200 may be of a structure sequentially stacking a plurality of layers having different refractive indexes and reflectivity. The dichroic reflection layer 200 includes recessed portions 205. In this embodiment, the dichroic reflection layer 200 is used as an example, but the present invention is not limited thereto. The dichroic reflection layer may be either of the dichroic reflection layer 200 or the dichroic reflection layer 200B in the foregoing embodiments. The quantum dot layer 500 may include quantum dot blocks 300' and 300" that emit different chromatic light. The quantum dot blocks 300' and 300" may be at least partially filled into the recessed portions 205 or may not be filled into the recessed portions 205.

As described in any of the foregoing embodiments, the quantum dot layer 500 may include quantum dot blocks emitting different chromatic light. For example, the quantum dot layer 500 may include the quantum dot block 300' that can emit red light after being excited by blue light, and the quantum dot block 300" that can emit green light after being excited by blue light, so that the display device 60 includes red subpixels RPX, green subpixels GPX, and blue subpixels BPX. A portion provided with the blue subpixels BPX does not need to be provided with any quantum dot block or recessed portion. To be specific, when the first chromatic light 110 is blue light, a part of the dichroic reflection layer 200 corresponding to red subpixels RPX and green subpixels GPX may be provided with recessed portions 205 to centralize red light and green light emitted through excitation of quantum dots. However, the present invention is not limited thereto, and the display device 60 may also include a combination of light of other colors. In addition, provided that the dichroic reflection layer 200, the recessed portions 205, and the quantum dot layer 500 are provided, the second structural portion 8000A may not include the protective layer 820 or the polarizer 850, or may further include another structure.

Next, the first structural portion 7000A may be further stacked on the second structural portion 8000A. The first structural portion 7000A may include, for example, a first substrate 700, a control circuit layer 710 disposed on the first substrate 700, and a plurality of pixel electrodes 720. The control circuit layer 710 includes at least a plurality of transistors (not shown) arranged as an array, a data line (not shown), and a scanning line (not shown). However, the present invention is not limited thereto. Next, the display medium layer 1000 may be disposed on the first structural portion 7000A. The display medium layer 1000 includes, for example, liquid crystal molecules 150.

Next, the third structural portion 9000A is further stacked on the display medium layer 1000. Specifically, the third structural portion 9000A may be a structure including a third substrate 900, a common electrode layer 910, and a polarizer 950.

Based on the above, the display device 60 includes the first chromatic light source 100, the first structural portion 7000A, the second structural portion 8000A, the display medium layer 1000, and the third structural portion 9000A. The display medium layer 1000 is disposed between the first substrate 700 and the third substrate 900. The second structural portion 8000A may further include the polarizer 850 in addition to the dichroic reflection layer 200 and the quantum dot layer 500. The quantum dot layer 500 is disposed between the first substrate 700 and the dichroic reflection layer 200, and the polarizer 850 is disposed between the quantum dot layer 500 and the first substrate 700.

According to Example 2, the display device 60 may include a structure provided with three layers of substrates (the substrate 240 of the dichroic reflection layer 200, the first substrate 700, and the third substrate 900), and the three layers of substrates may be preferably made of glass. According to this structure, the first chromatic light 110 emitted by the first chromatic light source 100 can be incident to the quantum dot layer 500 after passing through the dichroic reflection layer 200. Because subpixels (for example, the blue subpixels BPX) correspondingly emitting the first chromatic light 110 are not provided with any quantum dot block, the first chromatic light 110 may be emitted in said subpixels. On the contrast, after the first chromatic light 110 is incident to the quantum dot block 300' or 300", because quantum dots 310 respectively emit different chromatic light through excitation, second chromatic light 120 (for example, red light) and third chromatic light 130 (for example, green light) are respectively emitted after being centralized by the recessed portions 205. Therefore, various chromatic light that can be emitted sequentially passes through the first structural portion 7000A, the display medium layer 1000 performing adjustment and determining whether light can pass therethrough, and the third structural portion 9000A. Based on the above, the display device 60 that can emit various chromatic light by arranging and combining the chromatic light can be formed.

Example 3

Figure 10:
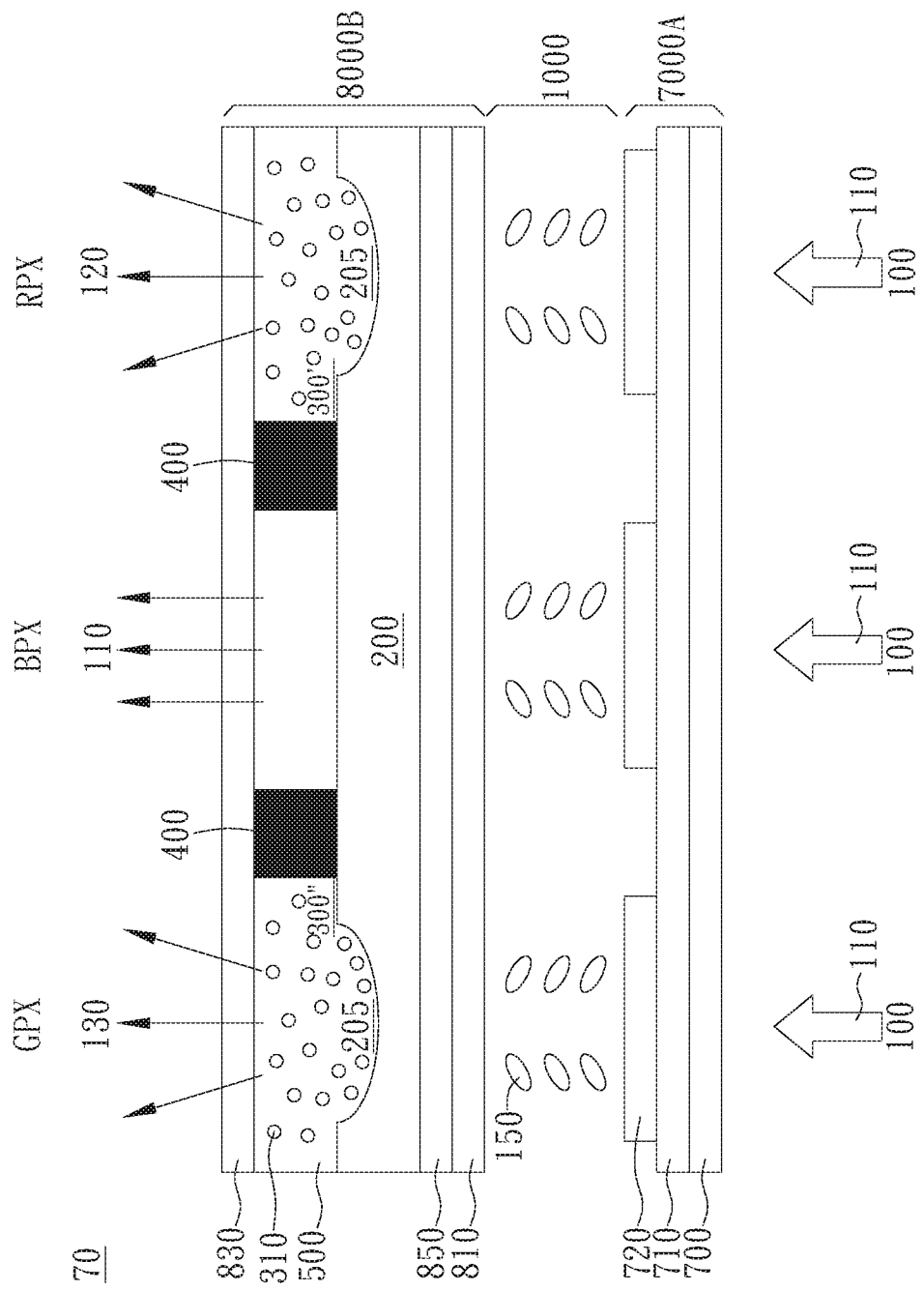
FIG. 10 is a schematic diagram of a display device according to another application example of the present invention.

An embodiment according to Example 3 is shown in FIG. 10, a display device 70 including a dichroic reflection layer 200 and a quantum dot layer 500 is a liquid crystal display device having two layers of substrates. A first structural portion 7000A, a display medium layer 1000, and a second structural portion 8000B may be sequentially disposed on a light emergent side of a first chromatic light source 100 emitting first chromatic light 110.

The first structural portion 7000A may include a first substrate 700, a control circuit layer 710 disposed on the first substrate 700, and a plurality of pixel electrodes 720. The control circuit layer 710 includes at least a plurality of transistors (not shown) arranged as an array, a data line (not shown), and a scanning line (not shown). However, the present invention is not limited thereto. Next, the display medium layer 1000 may be disposed on the first structural portion 7000A. The display medium layer 1000 includes, for example, liquid crystal molecules 150.

Further, the second structural portion 8000B may be disposed on the display medium layer 1000. To be specific, the second structural portion 8000B may include a common electrode layer 810, a polarizer 850, the dichroic reflection layer 200, the quantum dot layer 500, and a surface protective layer 830. In this embodiment, for a structure of the dichroic reflection layer 200, refer to FIG. 2. The dichroic reflection layer 200 includes a substrate 240 and a plurality of layers stacked on the substrate 240. In this embodiment, the dichroic reflection layer 200 is used as an example, but the present invention is not limited thereto. The dichroic reflection layer may be either of the dichroic reflection layer 200 or the dichroic reflection layer 200B in the foregoing embodiments. In this embodiment, quantum dot blocks 300' and 300" may be at least partially filled into recessed portions 205 or may not be filled into recessed portions 205. In addition, for example, the polarizer 850 may be of a structure formed by alternately stacking a coupling mirror, an intermediate dielectric layer, a wire grid polarizer, and the like. However, the present invention is not limited thereto.

Based on the above, the display device 70 includes the first chromatic light source 100, the first structural portion 7000A, the display medium layer 1000, and the second structural portion 8000B. The first substrate 700 is disposed between the first chromatic light source 100 and the dichroic reflection layer 200, and the display medium layer 1000 is disposed between the first substrate 700 and the dichroic reflection layer 200. In addition, the display device 70 further includes the polarizer 850 disposed between the display medium layer 1000 and the dichroic reflection layer 200.

According to Example 3, the display device 70 may include a structure provided with two layers of substrates (the first substrate 700 and the substrate 240 of the dichroic reflection layer 200), and the two layers of substrates may be preferably made of glass. According to this structure, the first chromatic light 110 emitted by the first chromatic light source 100 may sequentially pass through the first structural portion 7000A, the display medium layer 1000 performing adjustment and determining whether light can pass therethrough, a common electrode layer 810 in the second structural portion 8000B, the polarizer 850 in the second structural portion 8000B, and the dichroic reflection layer 200 in the second structural portion 8000B, and is incident to the quantum dot layer 500 in the second structural portion 8000B. Because subpixels (for example, the blue subpixels BPX) correspondingly emitting the first chromatic light 110 are not provided with any quantum dot block, the first chromatic light 110 may be emitted in said subpixels. On the contrast, after the first chromatic light 110 is incident to the quantum dot block 300' or 300", because quantum dots 310 respectively emit different chromatic light through excitation, second chromatic light 120 (for example, red light) and third chromatic light 130 (for example, green light) are respectively emitted after being centralized by the recessed portions 205. The chromatic light emitted through excitation can then be transmitted through and emitted from the surface protective layer 830 in the second structural portion 8000B. Therefore, the display device 70 that can emit a plurality of colors of chromatic light and arrange and combine the chromatic light to emit other colors of chromatic light can be formed.

Example 4

Figure 11:
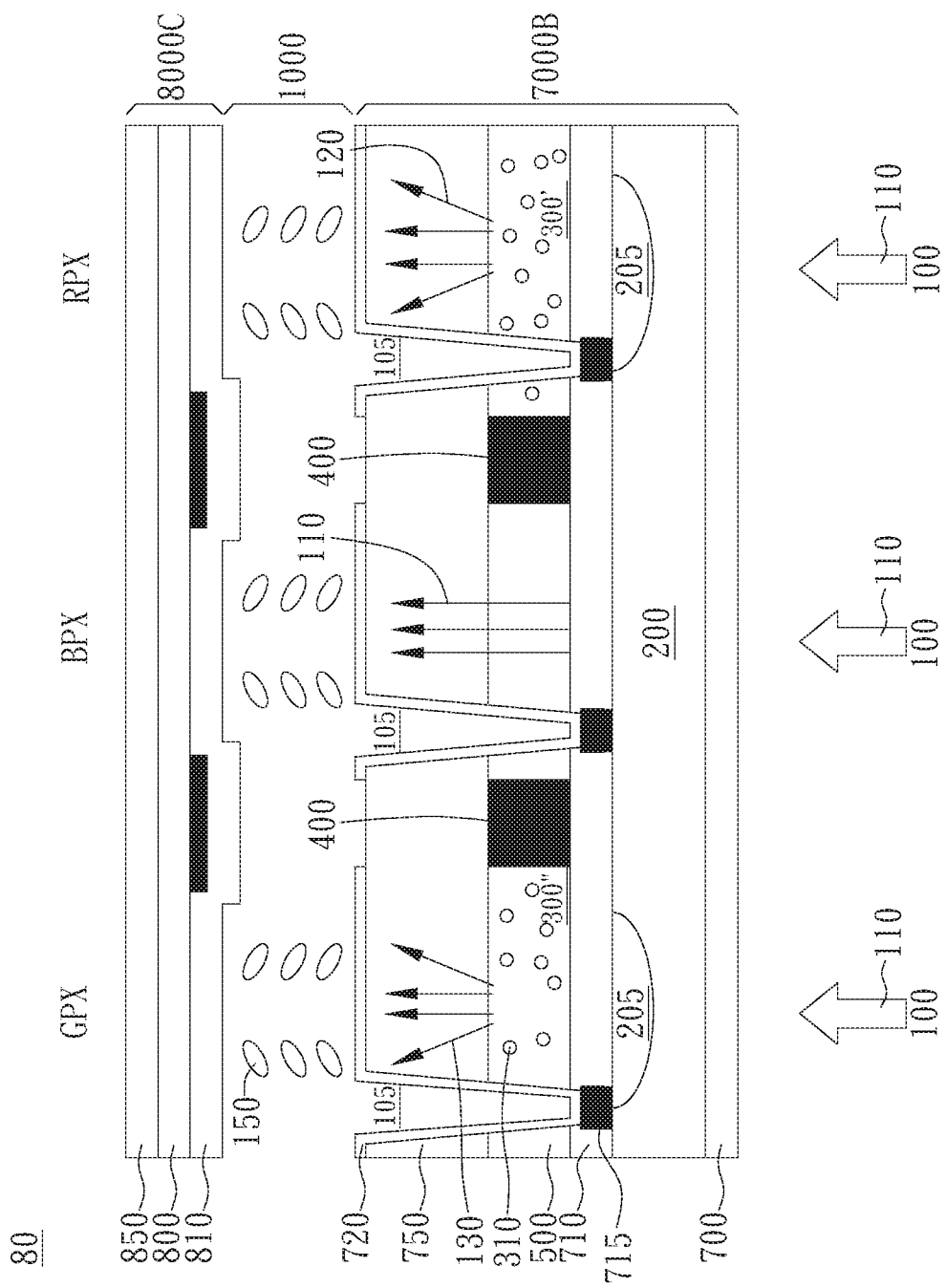
FIG. 11 is a schematic diagram of a display device according to another application example of the present invention.

An embodiment according to Example 4 is shown in FIG. 11, a display device 80 including a dichroic reflection layer 200 and a quantum dot layer 500 is a liquid crystal display device having two layers of substrates. A first structural portion 7000B, a display medium layer 1000, and a second structural portion 8000C may be sequentially disposed on a light emergent side of a first chromatic light source 100 emitting first chromatic light 110.

The first structural portion 7000B may include a first substrate 700, the dichroic reflection layer 200, a control circuit layer 710, the quantum dot layer 500, a plurality of pixel electrodes 720, and a polarizer 750. The control circuit layer 710 includes at least a plurality of transistors 715 arranged as an array, a data line (not shown), and a scanning line (not shown). The pixel electrodes 720 are electrically connected to the control circuit layer 710. To be more specific, the pixel electrodes 720 are disposed on the polarizer 750, and are electrically connected to the transistors 715 of the control circuit layer 710 through through-holes 105. In this embodiment, the polarizer 750 may include an intermediate dielectric layer and wire grid polarizer that are alternately stacked. However, the present invention is not limited thereto. In this embodiment, the dichroic reflection layer 200 is used as an example, but the present invention is not limited thereto. The dichroic reflection layer may be either of the dichroic reflection layer 200 or the dichroic reflection layer 200B in the foregoing embodiments.

Next, the display medium layer 1000 may be disposed on the first structural portion 7000B. The display medium layer 1000 includes, for example, liquid crystal molecules 150. The second structural portion 8000C may be disposed on the display medium layer 1000. The second structural portion 8000C may include a second substrate 800, a common electrode layer 810, and a polarizer 850.

Based on the above, the display device 80 includes the first chromatic light source 100, the dichroic reflection layer 200, the control circuit layer 710, the quantum dot layer 500, the polarizer 750, the plurality of pixel electrodes 720, the display medium layer 1000, and the second structural portion 8000C. The control circuit layer 710 is disposed between the dichroic reflection layer 200 and the quantum dot layer 500. The polarizer 750 is disposed on the quantum dot layer 500. The plurality of pixel electrodes 720 is disposed on the polarizer 750, and is electrically connected to the control circuit layer 710 through the plurality of through-holes 105. The display medium layer 1000 is disposed on the plurality of pixel electrodes 720, and is located between the plurality of pixel electrodes 720 and the second substrate 800. In addition, at least a part of the through-holes 105 respectively pass through the quantum dot block 300' or 300". Further, an available thickness of the control circuit layer 710 disposed between the dichroic reflection layer 200 and the quantum dot layer 500 may be determined according to the embodiments described with reference to FIG. 5A and FIG. 5B.

According to Example 4, the display device 80 may include a structure provided with two layers of substrates (a substrate 700 and the second substrate 800), and the two layers of substrates may be preferably made of glass. According to the foregoing description, the dichroic reflection layer 200 having recessed portions 205 and the quantum dot layer 500 may be integrated into the first structural portion 7000B. According to this structure, the first chromatic light 110 emitted by the first chromatic light source 100 can be incident to the quantum dot layer 500 after sequentially passing through the dichroic reflection layer 200 and the control circuit layer 710 in the first structural portion 7000B. Because subpixels (for example, the blue subpixels BPX) correspondingly emitting the first chromatic light 110 are not provided with any quantum dot block, the first chromatic light 110 may be emitted in said subpixels. On the contrast, after the first chromatic light 110 is incident to the quantum dot block 300' or 300", because quantum dots 310 respectively emit different chromatic light through excitation, second chromatic light 120 (for example, red light) and third chromatic light 130 (for example, green light) are respectively emitted after being centralized by the recessed portions 205. The chromatic light emitted through excitation can emit and sequentially pass through the polarizer 750 and the pixel electrode 720 in the first structural portion 7000B, the display medium layer 1000 performing adjustment and determining whether light can pass therethrough, and the second structural portion 8000C. Therefore, the display device 80 that can emit a plurality of colors of chromatic light and arrange and combine the chromatic light to emit other colors of chromatic light can be formed.

The examples shown in FIG. 8 to FIG. 11 are merely various examples in which the display device according to the embodiments of the present invention is integrated and applied to a general display device. Therefore, the display device in the present invention may be applied to various implementations on the basis of conforming to the intention of the present invention. Based on the above, the present invention is not limited to the embodiments specifically shown above.

In conclusion, the display device according to the embodiments of the present invention includes a dichroic reflection layer provided with a recessed portion, so that a possible light leakage of light emitted by quantum dots can be centralized. Therefore, the possible light leakage of the light emitted by the quantum dots can be reduced, and light intensity of a particular angle of view can be improved. Based on the above, according to the embodiments of the present invention, light emission efficiency and display quality of the display device can be further improved, thereby further improving user experience.

The foregoing shows merely some preferred embodiments of the present invention. It should be noted that various modifications and changes may be made to the present invention without departing from the spirit and the principle of the present invention. A person of ordinary skill in the art should know that the present invention is defined by the scope of the appended claims of this application, and changes such as various possible substitutions, combinations, modifications, conversions, and the like made within the intention of the present invention do not exceed the scope defined by the appended claims of this application.

LIST OF REFERENCE NUMERALS 10, 20, 30, 40, 50, 60, 70, and 80: Display device
15: Adjacent side
25: Hypotenuse
35: Opposite side
100: First chromatic light source
105: Through-hole
110: First chromatic light
120: Second chromatic light 130: Third chromatic light
150: Liquid crystal molecule
200 and 200B: Dichroic reflection layer
201: First surface
202: Second surface
203: End point
203': Imaginary end point
204: Imaginary plane
205 and 205B: Recessed portion
206: Protruding wall
210, 220, and 230: Layer
213: Bottom portion
215: Recessed bowl-shaped surface
240: Substrate
300, 300A, 300B, 300', and 300": Quantum dot block
301, 302, 302', 303, 304, and 305: Light
310: Quantum dot
315: Light receiving surface
320: Filling material
325: Light emergent surface
350: Boundary
400: Blocking portion
500 and 500B: Quantum dot layer
600: Intermediate layer
7000, 7000A, and 7000B: First structural portion
700: First substrate
710: Control circuit layer
715: Transistor
720: Pixel electrode
750: Polarizer
8000, 8000A, 8000B, and 8000C: Second structural portion
800: Second substrate
810: Common electrode layer
820: Protective layer
830: Surface protective layer
850: Polarizer
9000 and 9000A: Third structural portion
900: Third substrate
910: Common electrode layer
920: Protective layer
950: Polarizer
1000: Display medium layer
T1: First thickness
T2: Second thickness
A: Area
L: Major axis
W: Minor axis
k: Thickness
D: Minor-axis width
Th1 and Th2: Perpendicular distance
C: Focusing distance
$\theta_1$ and $\theta_2$: Angle
RPX: Red subpixel
GPX: Green subpixel
BPX: Blue subpixel

What is claimed is:

1. A display device, comprising:
a first chromatic light source, configured to generate first chromatic light;
a dichroic reflection layer, disposed on a light emergent side of the first chromatic light source, and configured to allow the first chromatic light to pass through, wherein the dichroic reflection layer has a first surface facing away from the first chromatic light source, and the first surface has a plurality of recessed portions;
a quantum dot layer, comprising a plurality of quantum dot blocks, wherein the quantum dot blocks are disposed corresponding to the recessed portions, and
wherein the quantum dot layer further comprises a plurality of blocking portions respectively located between the neighboring quantum dot blocks,
wherein the dichroic reflection layer comprises a plurality of protruding walls respectively located between the neighboring recessed portions, and the blocking portions are respectively disposed corresponding to the protruding walls.

2. The display device according to claim 1, wherein at least one of the blocking portions has a first thickness, at least one of the quantum dot blocks has a second thickness, and the first thickness is not less than the second thickness.

3. The display device according to claim 1, wherein the quantum dot layer is attached to the first surface, and the blocking portions are respectively attached to top portions of the protruding walls.

4. The display device according to claim 1, wherein at least one of the quantum dot blocks has a light receiving surface facing toward the dichroic reflection layer and a light emergent surface opposite to the light receiving surface, the at least one quantum dot block has a minor-axis width in a transverse direction parallel to the first surface, the recessed portion corresponding to the at least one quantum dot block has a recessed bowl-shaped surface, a perpendicular distance between a bottom portion of the recessed bowl-shaped surface and the light receiving surface is not greater than ¼ of the minor-axis width, and a perpendicular distance between the bottom portion of the recessed bowl-shaped surface and the light emergent surface is not less than ¼ of the minor-axis width.

5. The display device according to claim 4, wherein a cross-sectional shape of the recessed bowl-shaped surface on a cross section perpendicular to the first surface is a parabola.

6. The display device according to claim 1, wherein each of the quantum dot blocks has a minor-axis width in a transverse direction parallel to the first surface, a distance exists between the quantum dot layer and the first surface, and the distance is not greater than ¹⁄₁₂ of the minor-axis width.

7. The display device according to claim 1, wherein each recessed portion has a recessed bowl-shaped surface, and the recessed bowl-shaped surface and the quantum dot layer collectively define a cavity.

8. The display device according to claim 1, wherein each recessed portion has a recessed bowl-shaped surface, and the quantum dot block at least partially fills into the recessed portion and is in contact with the recessed bowl-shaped surface.

9. The display device according to claim 1, wherein the quantum dot blocks respectively fills into the recessed portions and are surrounded by the protruding walls.

10. The display device according to claim 1, further comprising a substrate and a display medium layer, wherein the substrate is disposed between the first chromatic light source and the dichroic reflection layer, and the display medium layer is disposed between the substrate and the dichroic reflection layer.

11. The display device according to claim 10, further comprising a polarizer disposed between the dichroic reflection layer and the quantum dot layer.

12. The display device according to claim 10, further comprising a polarizer disposed between the display medium layer and the dichroic reflection layer.

13. The display device according to claim 1, further comprising a polarizer, a first substrate, a second substrate, and a display medium layer disposed between the first substrate and the second substrate, wherein the quantum dot layer is disposed between the first substrate and the dichroic reflection layer, and the polarizer is disposed between the quantum dot layer and the first substrate.

14. The display device according to claim 1, further comprising:
- a control circuit layer, disposed between the dichroic reflection layer and the quantum dot layer;
- a polarizer, disposed on the quantum dot layer;
- a plurality of pixel electrodes, disposed on the polarizer and electrically connected to the control circuit layer through a plurality of through-holes;
- a display medium layer, disposed on the pixel electrodes; and
- a substrate, wherein the display medium layer is disposed between the pixel electrodes and the substrate.

15. The display device according to claim 1, wherein an emission spectrum peak of the first chromatic light is between 450 nm and 470 nm.

16. The display device according to claim 1, wherein the dichroic reflection layer at least partially reflects light other than the first chromatic light.

\* \* \* \* \*